(12) United States Patent  
Soreide et al.

(10) Patent No.: US 9,025,141 B1  
(45) Date of Patent: May 5, 2015

(54) POSITION DETERMINATION USING SYNTHETIC WAVE LASER RANGING

(71) Applicant: The Boeing Company, Chicago, IL (US)

(72) Inventors: David C. Soreide, Seattle, WA (US); Jonathan M. Saint Clair, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/075,925

(22) Filed: Nov. 8, 2013

(51) Int. Cl.
*G01S 17/36* (2006.01)

(52) U.S. Cl.
CPC ....................................... *G01S 17/36* (2013.01)

(58) Field of Classification Search
CPC ........... G01P 5/26; G01S 17/95; G01S 17/58; G01S 7/4818; G01C 3/08
USPC ............. 356/3.01–3.15, 4.01–4.1, 5.01–5.15, 356/6–22, 28, 28.5
See application file for complete search history.

(56) References Cited

U.S. PATENT DOCUMENTS

| 5,751,830 A * | 5/1998 | Hutchinson .................... 382/103 |
| 7,215,413 B2 | 5/2007 | Soreide et al. |
| 7,307,700 B1 | 12/2007 | Leep et al. |
| 2005/0002013 A1* | 1/2005 | Harris ............................ 356/4.1 |
| 2014/0036252 A1* | 2/2014 | Amzajerdian et al. .......... 356/28 |

OTHER PUBLICATIONS

Nicolas Schuhler, Yves Salvade, Rene Dandliker, Ronald Holzwarth, "Frequency-comb-referenced two-wavelength source for absolute distance measurement", Optics Letters, Nov. 1, 2006, pp. 3101-3103, vol. 31, No. 21, Optical Society of America.

Jun Ye, Steven T. Cundiff, "Femtosecond Optical Frequency Comb: Principle, Operation, and Applications", Kluwer Academic Publishers/Springer, Sep. 2004.

* cited by examiner

*Primary Examiner* — Luke Ratcliffe

(74) *Attorney, Agent, or Firm* — Duft Bornsen & Fettig LLP

(57) ABSTRACT

Systems and methods for determining the position of an object in a coordinate system. An exemplary system includes three or more laser ranging sensors each configured to direct a sensor beam of continuous-wave light toward a target. Light reflecting off the target interferes with the sensor beam creating an interference beam. The interference beam is combined with local oscillator beams in each laser ranging sensor to create a synthetic wave beam. Each of the laser ranging sensors also includes an array of photodetectors that sense the synthetic wave beam, and is able to measure a distance to the target based on output from the array of photodetectors. The system further includes a controller that receives a distance measurement from each of the laser ranging sensors, and calculates a position of the target in the coordinate system based on the distance measurements.

20 Claims, 10 Drawing Sheets

POSITION DETERMINATION USING SYNTHETIC WAVE LASER RANGING

FIELD

This disclosure relates to the field of lasers, and more particularly, to laser ranging sensors that may be used in applications, such as manufacturing and/or assembly of large objects.

BACKGROUND

The term "ranging" refers to a process of determining the distance from one location to another. There are a variety of systems that are able to determine distance, such as SONAR (SOund Navigation And Ranging), RADAR (RAdio Detection And Ranging), LIDAR (LIght Detection And Ranging), and LADAR (LAser Detection And Ranging). One type of ranging technique uses travel time measurements to determine distance. For example, a sensor may transmit a sound or light pulse at a target, and measure a time until an echo is reflected off of the target to determine the distance to the object. Other types of ranging techniques use continuous sound or light waves. For example, a sensor may transmit a continuous sound or light wave at a target, and reflections from the target will interfere with the sound or light wave creating an "interference" wave. When the transmitted wave and the reflected wave (of the same frequency) combine to form the interference wave, the resulting pattern of the interference wave is determined by the phase difference between the transmitted wave and the reflected wave. This phase difference can be used to determine the distance to the target.

Ranging sensors such as this may be used in the manufacture or assembly of products, such as aircraft. When parts are being assembled, precise measurements may be needed in order to assure that the parts are assembled correctly. It can be difficult to match shapes and contours of large parts during assembly, especially when they are fabricated at different locations. If laser ranging sensors are used in assembly processes, it is desirable to design the laser ranging sensors to provides measurements with a very high-precision.

SUMMARY

Embodiments described herein provide improved systems and methods that implement laser ranging sensors. A system as described herein uses three or more laser ranging sensors to determine a position of a target in a coordinate system. For example, if the target is on an object being assembled in a facility, three or more laser ranging sensors may be installed at known locations in the facility to measure a distance to the target. Using the distance measurements from the laser ranging sensors, the position of the target can be determined accurately, such as by trilateration.

The laser ranging sensors as described herein use synthetic wave interferometry to measure distances to targets. More particularly, the laser ranging sensors use a ladder of synthetic waves having increasing wavelengths to calculate accurate distance measurement to the targets. An exemplary laser ranging sensor mixes light beams from multiple continuous-wave lasers to generate a sensor beam, and directs or projects the sensor beam at the target as a cone of light. When light reflects off the target, the reflections interfere with the sensor beam from the laser ranging sensor resulting in an interference beam. The continuous-wave lasers emit light beams at different frequencies. When the light beams are mixed in the interference beam, the light beams of different frequencies will generate "beat" frequencies referred to herein as "synthetic waves". Because multiple continuous-wave lasers are used, a ladder of synthetic waves is created. The characteristics of the synthetic waves can then be processed to measure a distance.

Also, within a laser ranging sensor, a portion of the light beams from the continuous-wave lasers are split off and frequency shifted to generate local oscillator beams. When the local oscillator beams are mixed with the interference beam, heterodynes are produced based on the difference between the frequency of a light beam from a continuous-wave laser and its corresponding local oscillator beam. The heterodynes carry information (e.g., amplitude and phase) of the interference beam, but at a lower frequency. Therefore, an optical phase can be determined for each heterodyne, and the optical phases of the heterodynes may be used to determine the phases of the synthetic waves. The wavelength and phase of the synthetic waves may then be used to determine the distance to the target.

One embodiment comprises an apparatus for determining a position of a target in a coordinate system. The apparatus includes three or more laser ranging sensors each configured to direct a sensor beam of continuous-wave light toward a target, where a beam spread of the sensor beam has a width greater than a width of the target. The laser ranging sensors are each configured to combine an interference beam, resulting from light reflecting off the target and interfering with the sensor beam, with local oscillator beams to generate a synthetic wave beam. Each laser ranging sensors also includes a photodetector device comprising an array of photodetectors configured to sense the synthetic wave beam. Each of the laser ranging sensors is configured to measure a distance to the target based on output from the array of photodetectors. The apparatus further includes a controller configured to receive a distance measurement from each of the laser ranging sensors, and to calculate a position of the target in a coordinate system based on the distance measurements.

In another embodiment, one or more of the laser ranging sensors includes a first continuous-wave laser configured to generate a first light beam, a second continuous-wave laser configured to generate a second light beam, and a third continuous-wave laser configured to generate a third light beam. The laser ranging sensor also includes an optical combiner configured to combine the first, second, and third light beams to generate the sensor beam, and a telescope configured to focus the sensor beam onto the target where light reflected from the target interferes with the sensor beam resulting in the interference beam. The laser ranging sensor also includes a frequency shifter unit configured to receive a portion of the first, second, and third light beams, and to frequency shift the first, second, and third light beams to generate first, second, and third local oscillator beams. Another optical combiner of the laser ranging sensor is configured to combine the interference beam and the first, second, and third local oscillator beams to generate the synthetic wave beam. The array of photodetectors within the laser ranging sensor is configured to sense the synthetic wave beam to generate output signals that are provided to a signal processor. The signal processor is configured to process the output signals to detect a first heterodyne produced by combination of the first light beam and the first local oscillator beam, to detect a second heterodyne produced by combination of the second light beam and the second local oscillator beam, to detect a third heterodyne produced by combination of the third light beam and the third local oscillator beam, and to determine optical phases for each of the first, second, and third heterodynes. The signal processor is further configured to determine a first synthetic wavelength based on a difference between a first frequency of the first light beam and a second frequency of the second light beam, to determine a first synthetic phase based on a difference between a first optical phase of the first heterodyne and a second optical phase of the second heterodyne, and to determine a distance to the target based on the first synthetic wavelength and the first synthetic phase.

In another embodiment, the signal processor is configured to determine a second synthetic wavelength based on a difference between the first frequency of the first light beam and a third frequency of the third light beam, to determine a second synthetic phase based on a difference between the first optical phase of the first heterodyne and a third optical phase of the third heterodyne, and to determine the distance to the target based further on the second synthetic wavelength and the second synthetic phase.

In another embodiment, an exemplary laser ranging sensor includes a frequency comb laser configured to generate a set of light beams comprising a frequency comb, and another optical combiner configured to combine the set of light beams from the frequency comb laser with the first, second, and third light beams from the first, second, and third continuous-wave lasers. The laser ranging sensor further includes a phase-lock controller configured to compare the frequencies of the first, second, and third light beams with the frequency comb generated by the frequency comb laser, and to tune the frequencies of the first, second, and third light beams from the first, second, and third continuous-wave lasers to different teeth of the frequency comb. Also, the separation of the teeth of the frequency comb is equal to a pulse repetition frequency used within the frequency comb laser. The pulse repetition frequency may be tied to a frequency standard from a standards organization, such as National Institute of Standards and Technology (NIST). Therefore, the measurements from the system may be traceable to a NIST standard or other standard, and will be the same regardless of the environment or location of the system.

Another embodiment comprises a method of determining the position of a target in a coordinate system. The method includes directing a sensor beam of continuous-wave light toward the target from each of at least three laser ranging sensors, where a beam spread of the sensor beam has a width greater than a width of the target. The method further includes combining an interference beam, resulting from light reflecting off the target and interfering with the sensor beam, with local oscillator beams to generate a synthetic wave beam. The method further comprises sensing the synthetic wave beam using an array of photodetectors, and measuring a distance to the target in each of the laser ranging sensors based on output from the array of photodetectors. The method further includes calculating the position of the target in a coordinate system based on the distance measurements from the laser ranging sensors.

The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
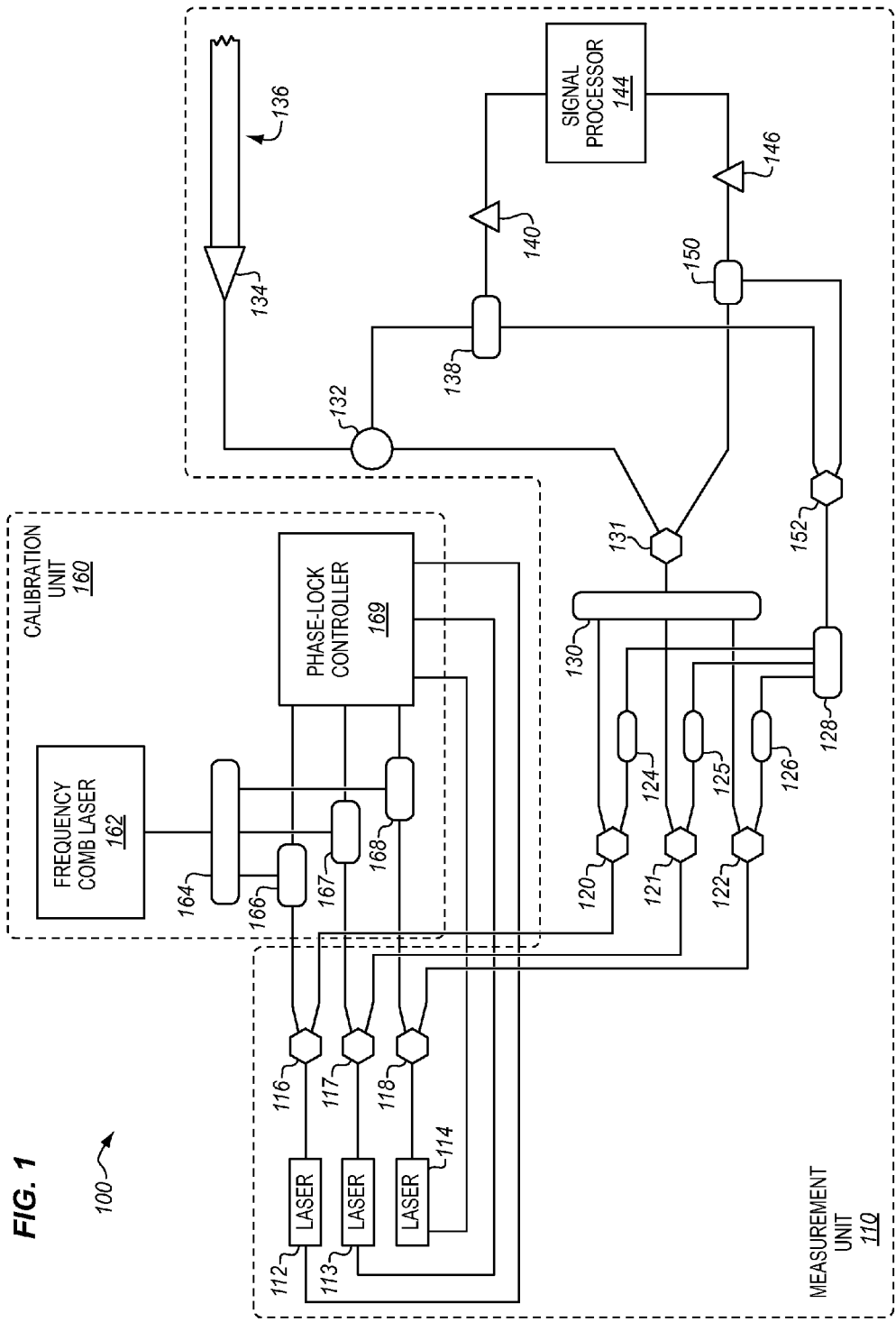
FIG. 1 illustrates a laser ranging sensor in an exemplary embodiment.

FIG. 1 illustrates a laser ranging (e.g., LADAR) sensor 100 in an exemplary embodiment. Sensor 100 is operable to perform distance or ranging measurements from the sensor 100 to a target (not shown in FIG. 1). For example, sensor 100 may be used in assembly or manufacturing processes to precisely measure large objects, such as parts of an aircraft. If large objects such as this are manufactured at different locations, problems may occur during assembly if the shapes and contours of matching parts are not precisely formed. Therefore, laser ranging sensors of the type described herein may be used at different locations to precisely measure parts as they are manufactured or assembled.

Figure 2:
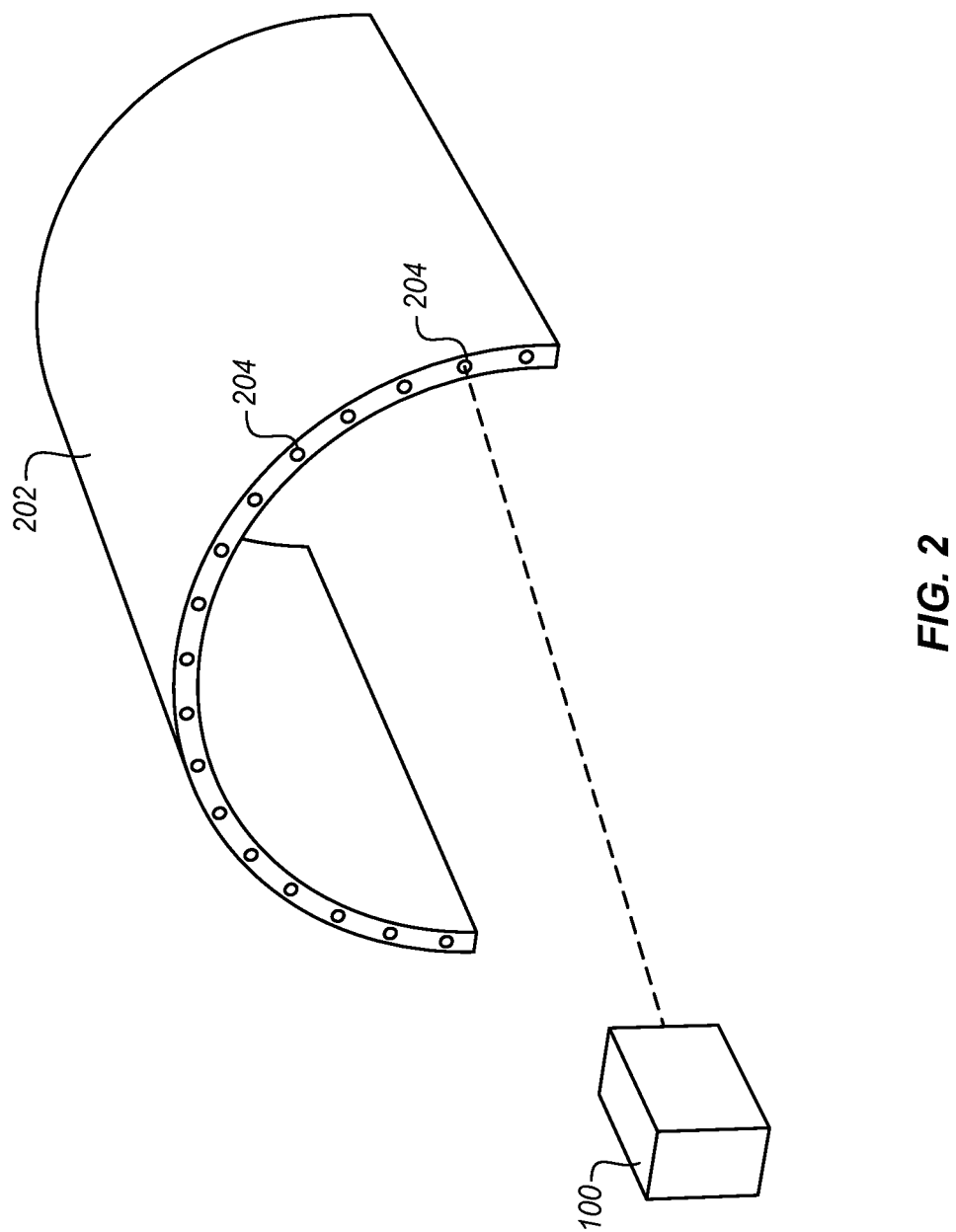
FIG. 2 illustrates a laser ranging sensor measuring a distance to a target in an exemplary embodiment.

FIG. 2 illustrates sensor 100 measuring a distance to a target in an exemplary embodiment. Server 100 is aimed at an object 202, such as a part of an aircraft being assembled or manufactured. Sensor 100 is able to measure a distance to one or more targets 204 on object 202. For example, sensor 100 may measure the distance to an edge of a part being assembled. Targets 204 may comprise retro-reflective targets or non-cooperative targets that do not include retro-reflectors.

In the embodiment shown in FIG. 1, sensor 100 includes a measurement unit 110 and a calibration unit 160. Measurement unit 110 includes components that measure a distance to a target using synthetic wave interferometry. Interferometry is a technique for superimposing waves (e.g., light waves) and extracting information from the combination of the waves. As a simplified example of using interferometry, a light beam is split into two identical beams by a beam splitter. Each of the beams travels on a different path, and is recombined at a detector. If there are differences in the paths traveled by the beams (e.g., distance), then a phase difference is created between the beams. The phase difference between the beams may be used to determine a length of a path and consequently a distance to a target.

When a light beam is transmitted at a target, light reflected from the target will interfere with the light beam being transmitted. The reflected beam will be at the same frequency as the transmitted beam when the target is stationary. When the transmitted light is in-phase with the reflected light (at the same frequency), then constructive interference occurs. When the transmitted light is out-of-phase with the reflected light, then destructive interference occurs. The result of the interference is referred to as an "interference" beam.

As will be described in more detail below, measurement unit 110 combines light beams from multiple lasers at closely-spaced light frequencies to direct a beam at the target. The closely-spaced light frequencies will generate a set of beat frequencies in the interference beam, which are referred to herein as a ladder or set of "synthetic waves". Measurement unit 110 is able to determine the phase (referred to herein as a synthetic phase) of each synthetic wave, and then measure a distance to the target based on the phases of the synthetic waves. Because measurement unit 110 uses a set of lasers having different frequencies, a ladder of synthetic phases is created from the ladder of synthetic waves. One of the synthetic waves (the wave having the longest wavelength) is a direct measurement of the distance to the target (assuming the target is less than one wavelength away), but the accuracy of the measurement may not be sufficient. The accuracy of distance measurement from this synthetic wave is sufficient to locate the absolute number of wavelengths for the next synthetic wave. The phase of the next synthetic wave (the wave having the next longest wavelength) provides an increase in the accuracy of the distance measurement. This process may be repeated for each phase of the ladder until the desired accuracy is obtained.

Calibration unit 160 includes components that operate to calibrate measurement unit 110 for performing distance measurements. As described in more detail below, calibration unit 160 uses a frequency comb laser to tune continuous-wave (CW) lasers within measurement unit 110. A frequency comb laser is a light source with a spectrum comprising a series of discrete and equally spaced modes. The CW lasers within measurement unit 110 are tuned to different teeth of the frequency comb. Because the teeth of the frequency comb are at precise frequencies, the CW lasers of measurement unit 110 will be tuned to precise frequencies.

To create the ladder of synthetic waves, measurement unit 110 includes three measurement channels in FIG. 1 each having a CW laser 112-114. Lasers 112-114 are each tuned to a different wavelength. For example, laser 112 may be tuned to $\lambda_1$, laser 113 may be tuned to $\lambda_2$, and laser 114 may be tuned to $\lambda_3$. Wavelength $\lambda_1$ may be about 1550 nanometers (nm), wavelength $\lambda_2$ may be about 1550.08 nm, and $\lambda_3$ may be about 1550.8 nm. While different wavelengths may be selected as desired for a particular application, there should be a difference in the wavelengths from each of the lasers 112-114. The different wavelengths enable generation of an interference that will be processed to determine a range to a target.

For the first measurement channel, laser 112 is coupled to a beam splitter 116 by an optical fiber. Splitter 116 is coupled to another beam splitter 120 by an optical fiber. Splitter 116 is configured to split a light beam from laser 112. A portion of the light beam from laser 112 travels to splitter 120 within measurement unit 110, and a portion of the light beam travels to an optical combiner 166 within calibration unit 160 (which will be described later). Splitter 120 connects to a frequency shifter 124 via an optical fiber, and connects to an optical combiner 130 via an optical fiber. Splitter 120 is configured to split the light beam from laser 112 again. A portion of the light beam from laser 112 travels to frequency shifter 124, and a portion of the light beam travels to combiner 130. Frequency shifter 124 is configured to frequency shift the light beam from laser 112 by a fixed amount. For example, frequency shifter 124 may shift the frequency of the light beam from laser 112 by 170 Hz. Some examples of frequency shifter 124 are an Acousto-Optic Modulator (AOM) and a Doppler shifter. The frequency-shifted light beam is referred to as the local oscillator beam for the first measurement channel. The local oscillator beam for the first measurement channel then travels from frequency shifter 124 to an optical combiner 128.

For the second measurement channel, laser 113 is coupled to a beam splitter 117 by an optical fiber. Splitter 117 is coupled to another beam splitter 121 by an optical fiber. Splitter 117 is configured to split a light beam from laser 113. A portion of the light beam from laser 113 travels to splitter 121 within measurement unit 110, and a portion of the light beam travels to an optical combiner 167 within calibration unit 160. Splitter 121 connects to a frequency shifter 125 via an optical fiber, and connects to combiner 130 via an optical fiber. Splitter 121 is configured to split the laser beam from laser 113 again. A portion of the light beam from laser 113 travels to frequency shifter 125, and a portion of the light beam travels to combiner 130. Frequency shifter 125 is configured to frequency shift the light beam from laser 113 by a fixed amount (and different than frequency shifter 124) to create a local oscillator beam for the second measurement channel. The local oscillator beam for the second measurement channel then travels to combiner 128.

For the third measurement channel, laser 114 is coupled to a beam splitter 118 by an optical fiber. Splitter 118 is coupled to another beam splitter 122 by an optical fiber. Splitter 118 is configured to split a light beam from laser 114. A portion of the light beam from laser 114 travels to splitter 122 within measurement unit 110, and a portion of the light beam travels to an optical combiner 168 within calibration unit 160. Splitter 122 connects to a frequency shifter 126 via an optical fiber, and connects to combiner 130 via an optical fiber. Splitter 122 is configured to split the laser beam from laser 114 again. A portion of the light beam from laser 114 travels to frequency shifter 126, and a portion of the light beam travels to combiner 130. Frequency shifter 126 is configured to frequency shift the light beam from laser 114 by a fixed amount (and different than frequency shifters 124 and 125) to create a local oscillator beam for the third measurement channel. The local oscillator beam for the third measurement channel then travels to combiner 128.

Although three measurement channels are shown in FIG. 1, measurement unit 110 may include more channels. Three or more measurement channels are used in measurement unit 110 to provide the precision desired for the distance measurements. Also, although three frequency shifters 124-126 are shown in FIG. 1, a shared frequency shifter unit may be implemented to create the local oscillator beams as described above.

The light beams from the three measurement channels are combined or mixed within combiner 130 to form a sensor beam. Combiner 130 connects to a beam splitter 131 via an optical fiber. Splitter 131 is configured to split the sensor beam. A portion of the sensor beam travels to a circulator 132, and a portion of the sensor beam travels to an optical combiner 150 of a reference channel, which is described in more detail below. The sensor beam travels through circulator 132 to a telescope 134. Telescope 134 is configured to focus the sensor beam toward the target (not shown in FIG. 1) being measured.

When telescope 134 directs the sensor beam at the target, light reflected off the target will interfere with the sensor beam resulting in an "interference" beam 136. Circulator 132 then directs the interference beam 136 to an optical combiner 138. Concurrently, the local oscillator beams for the three measurement channels are combined or mixed within combiner 128 to form a collective local oscillator beam. The collective local oscillator beam travels from combiner 128 to a beam splitter 152. Splitter 152 is configured to split the collective local oscillator beam. A portion of the collective local oscillator beam travels to combiner 138, and a portion of the collective local oscillator beam travels to combiner 150. Combiner 138 is configured to combine or mix the interference beam with the collective local oscillator beam to generate a "synthetic wave" beam. The synthetic wave beam is projected onto a photodetector device 140. Photodetector device 140 may comprise a single photodetector element, or may comprise an array of photodetector elements, such as in a digital camera. Photodetector device 140 is configured to sense the light from the synthetic wave beam, and provide output signals to a signal processor 144.

Measurement unit 110 also includes a reference channel. For the reference channel, the portion of the sensor beam split from splitter 131 travels to combiner 150. Concurrently, a portion of the collective local oscillator beam from splitter 152 travels to combiner 150. Combiner 150 is configured to combine or mix the sensor beam with the collective local oscillator beam to generate a reference "synthetic wave" beam. The reference synthetic wave beam is projected onto a photodetector device 146. Photodetector device 146 is configured to sense the light from the reference synthetic wave beam, and provide output signals to signal processor 144.

Calibration unit 160 includes a frequency comb laser 162 that connects to a beam splitter 164 via an optical fiber. Splitter 164 connects to combiners 166-168 via optical fibers. Splitter 164 is configured to split light beams from frequency comb laser 162, so that a portion of the light beams from frequency comb laser 162 travels to combiners 166-168. Combiners 166-168 are each configured to combine or mix the light beams from frequency comb laser 162 with light beams from their respective measurement channels. Combiners 166-168 each connect with a phase-lock controller 169. Controller 169 in turn connects with each of the lasers 112-114.

The architecture of sensor 100 as shown in FIG. 1 is just one example. There may be variations to this architecture that allow sensor 100 to be operated as described below.

Figure 3:
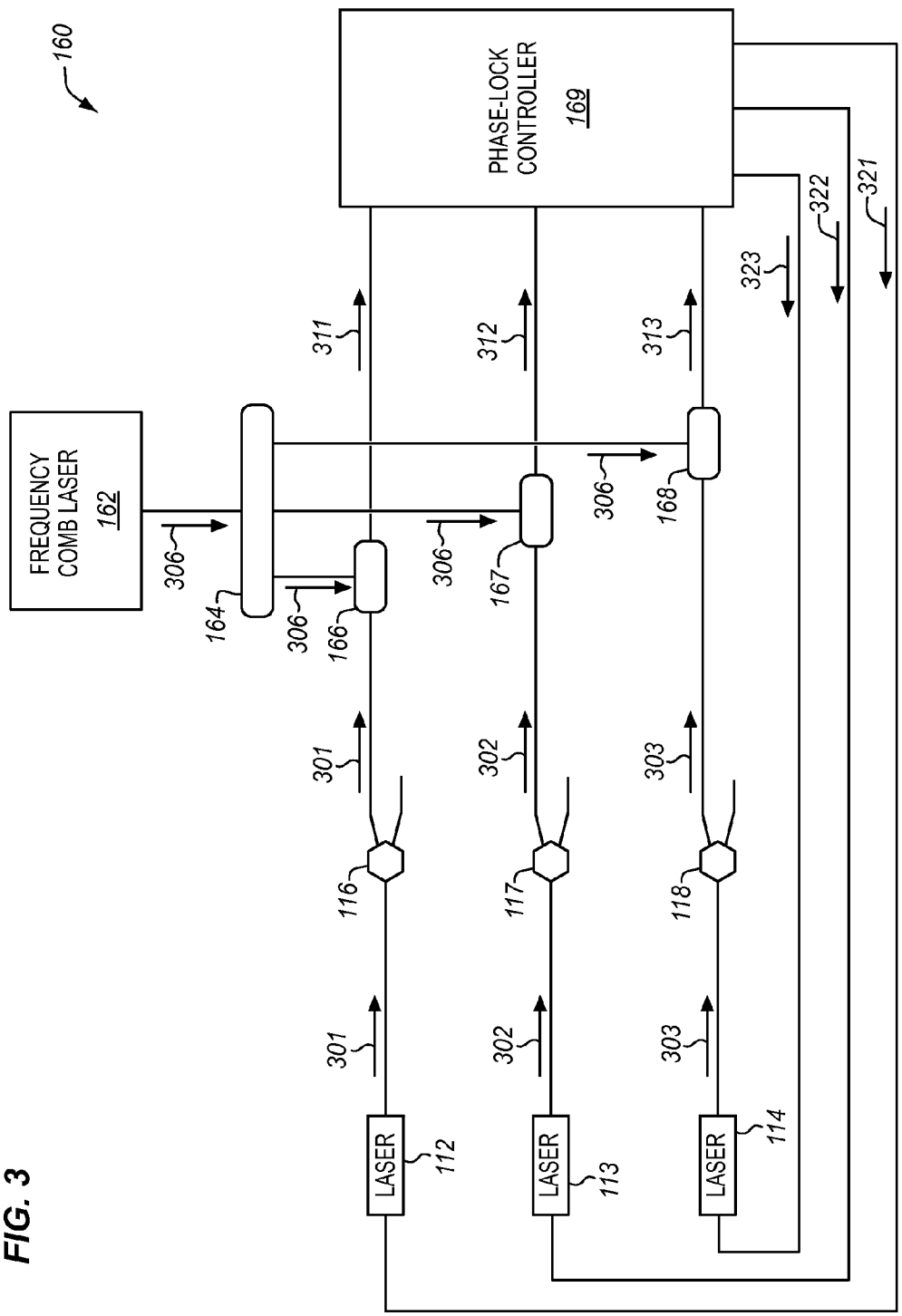
FIG. 3 illustrates a calibration unit operating to calibrate a measurement unit in an exemplary embodiment.

The following describes an exemplary operation of sensor 100. To perform a precise distance measurement, measurement unit 110 within sensor 100 is calibrated by calibration unit 160. FIG. 3 illustrates calibration unit 160 operating to calibrate measurement unit 110 in an exemplary embodiment. Lasers 112-114 transmit light beams 301-303 that travel to splitters 116-118, respectively. Splitter 116 provides a portion of the light beam 301 from laser 112 to combiner 166, splitter 117 provides a portion of the light beam 302 from laser 113 to combiner 167, and splitter 118 provides a portion of the light beam 303 from laser 114 to combiner 168.

Concurrently, frequency comb laser 162 generates a set of light beams 306 that comprises a frequency comb. To generate a frequency comb, laser 162 has a light source (e.g., a femtosecond laser) that is able to generate ultra-short pulses of light. The light source emits a regular train of short light pulses separated in time by a repetition period $T_{rep}$. The electromagnetic field of the carrier light wave, which makes up these pulses, oscillates at a much higher frequency. The train of pulses from the light source consists of a comb of optical frequencies with a spacing equal to the pulse repetition frequency, $f_{rep}$. The carrier signal, $f_c$, is amplitude modulated, which produces sidebands in the frequency domain with a spacing equal to the modulation frequency, $f_{rep}$. In the frequency domain, the sidebands resemble teeth on a comb that are centered about the carrier frequency. The frequency of any one of the comb teeth (also referred to as comb elements) is:

$$f = n \times f_{rep} + f_o,$$

where n is an integer, $f_{rep}$ is the pulse repetition frequency, and $f_o$ is the carrier offset frequency.

Frequency comb laser 162 therefore generates a set of light beams 306 separated in wavelength by the pulse repetition frequency used within laser 162. Splitter 164 receives the light beams 306 from laser 162, and provides a portion of the light beams 306 to each of combiners 166-168. Combiner 166 combines the light beams from frequency comb laser 162 with the light beam from laser 112 of the first measurement channel, and provides the combined light beam 311 to phase-lock controller 169. Combiner 167 combines the light beams from frequency comb laser 162 with the light beam from laser 113 of the second measurement channel, and provides the combined light beam 312 to phase-lock controller 169. Similarly, combiner 168 combines the light beams from frequency comb laser 162 with the light beam from laser 114 of the third measurement channel, and provides the combined light beam 313 to phase-lock controller 169.

Phase-lock controller 169 is able to compare the frequencies of lasers 112-114 to the set of light beams generated by frequency comb laser 162. Phase-lock controller 169 is then able to tune lasers 112-114 to individual teeth of the frequency comb by sending control signals 321-323 to lasers 112-114, respectively. For example, phase-lock controller 169 selects a tooth on the frequency comb, and then adjusts the output of laser 112 to a fixed and known offset from the frequency of the selected tooth of the frequency comb (typically a small fraction of the spacing between the comb teeth). Phase-lock controller 169 performs a similar process for each of lasers 112-114 until each laser is operating at the desired frequency. This advantageously tunes lasers 112-114 to exact wavelengths, with known differences between the wavelengths of each laser 112-114.

Also, by tuning measurement unit 110 as described above, distances measured by measurement unit 110 may be traceable to a standard, such as the National Institute of Standards and Technology (NIST). The teeth of the comb from frequency comb laser 162 are separated by the pulse repetition frequency of frequency comb laser 162, and lasers 112-114 are precisely tuned to teeth of the frequency comb. Therefore, if the pulse repetition frequency of frequency comb laser 162 can be tied to a known frequency standard, then distances measured from measurement unit 110 may be traceable to the standard.

Figure 4:
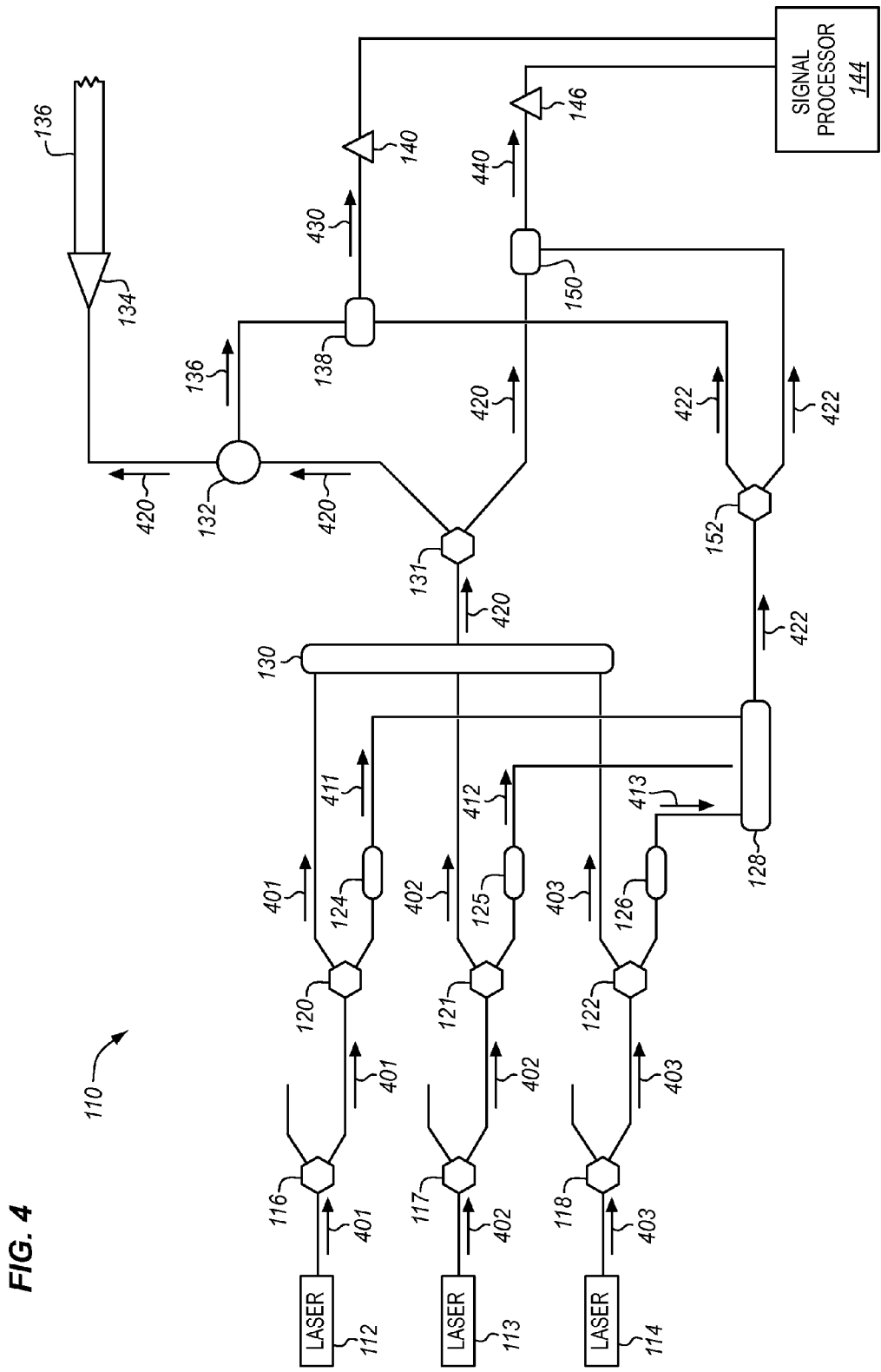
FIG. 4 illustrates a measurement unit operating to perform a distance measurement in an exemplary embodiment.

After calibration, measurement unit 110 is able to perform a distance measurement to a target. FIG. 4 illustrates measurement unit 110 operating to perform a distance measurement in an exemplary embodiment. Looking at the first measurement channel, laser 112 transmits a light beam 401 to splitter 116, which provides a portion of the light beam 401 to splitter 120. Splitter 120 in turn provides a portion of the light beam 401 to combiner 130, and a portion of the light beam 401 to frequency shifter 124. Frequency shifter 124 shifts the frequency of the light beam 401 by a known amount (e.g., 170

Hz) to generate a local oscillator beam 411 for the first measurement channel. The local oscillator beam 411 for the first measurement channel then travels from frequency shifter 124 to combiner 128.

A similar process takes place for the second and third measurement channels. For the second measurement channel, laser 113 transmits a light beam 402 to splitter 117, which provides a portion of the light beam 402 to splitter 121. Splitter 121 in turn provides a portion of the light beam 402 to combiner 130, and a portion of the light beam 402 to frequency shifter 125. Frequency shifter 125 shifts the frequency of the light beam 402 by a known amount (different from frequency shifter 124) to generate the local oscillator beam 412 for the second measurement channel. The local oscillator beam 412 for the second measurement channel then travels from frequency shifter 125 to combiner 128. For the third measurement channel, laser 114 transmits a light beam 403 to splitter 118, which provides a portion of the light beam 403 to splitter 122. Splitter 122 in turn provides a portion of the light beam 403 to combiner 130, and a portion of the light beam 403 to frequency shifter 126. Frequency shifter 126 shifts the frequency of the light beam 403 by a known amount (different from frequency shifters 124 and 125) to generate the local oscillator beam 413 for the third measurement channel. The local oscillator beam 413 for the third measurement channel then travels from frequency shifter 126 to combiner 128.

The light beams 401-403 for the measurement channels are combined or mixed within combiner 130 to generate a sensor beam 420 for measurement unit 110. Splitter 131 splits sensor beam 420. A portion of sensor beam 420 travels to telescope 134 through circulator 132, and a portion of sensor beam 420 travels to combiner 150 of the reference channel. Telescope 134 is then used to focus the sensor beam 420 toward the target being measured. As the sensor beam 420 reflects off the target, light reflected off the target will interfere with the sensor beam 420 resulting in the interference beam 136. Interference beam 136 travels back through circulator 132 to combiner 138. Also, the local oscillator beams 411-413 for the measurement channels are combined or mixed within combiner 128 to generate the collective local oscillator beam 422. The collective local oscillator beam 422 is split by splitter 152. A portion of collective local oscillator beam 422 travels to combiner 138, and a portion of collective local oscillator beam 422 travels to combiner 150.

Combiner 138 receives interference beam 136 and collective local oscillator beam 422, and combines or mixes these beams to generate a synthetic wave beam 430. Synthetic wave beam 430 then travels to photodetector device 140, where photodetector device 140 is configured to convert light from the synthetic wave beam 430 into electrical signals. Photodetector device 140 then provides the electrical signals to signal processor 144. The electrical signals comprise multiple samples of synthetic wave beam 430 over time.

Figure 5:
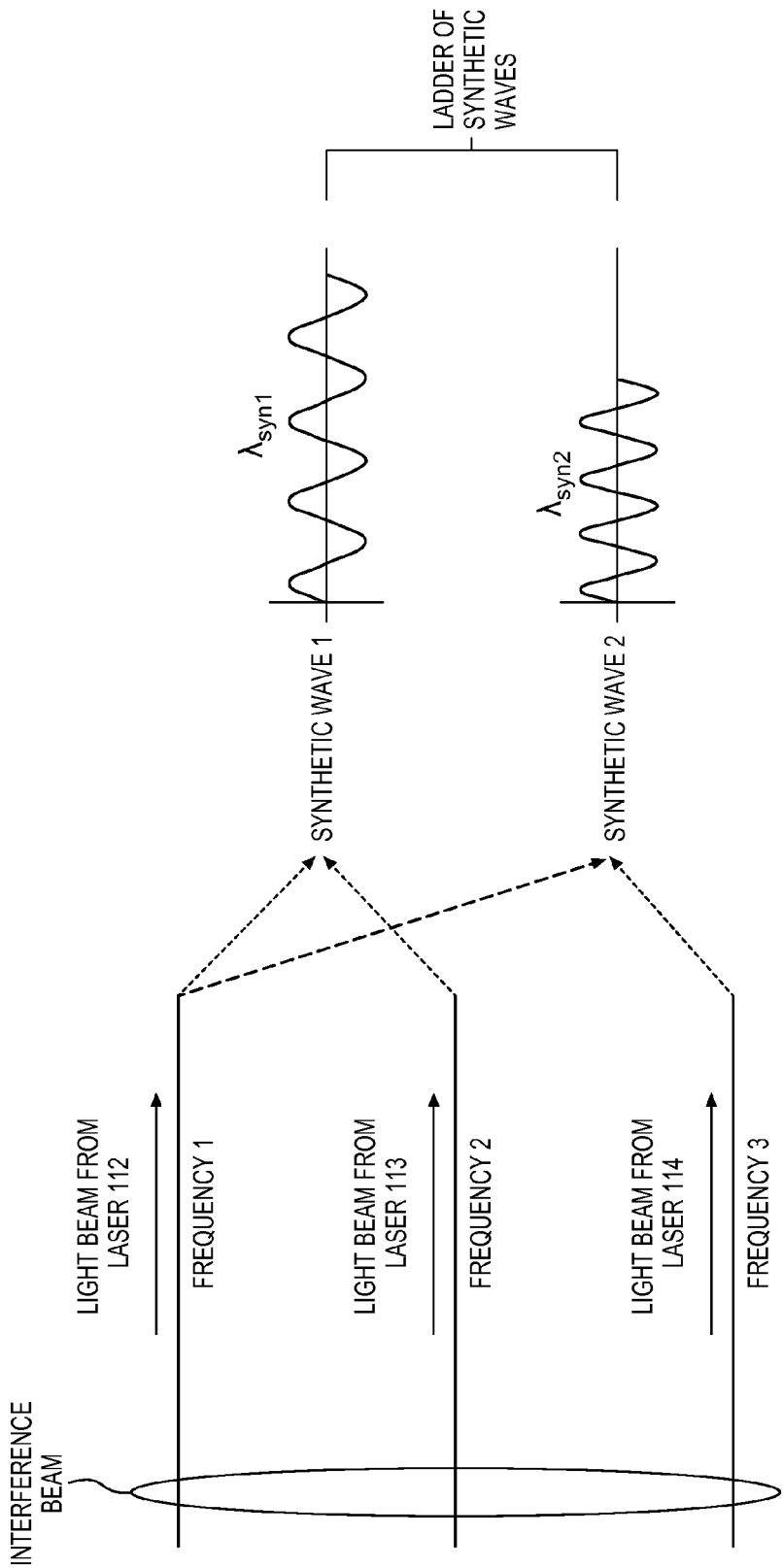
FIG. 5 illustrates a ladder of synthetic waves in an exemplary embodiment.

Signal processor 144 receives the output signals from photodetector device 140, and is able to process the output signals from photodetector device 140 to identify a ladder of synthetic waves from the synthetic wave beam 430. The ladder of synthetic waves is created by the frequency differences between lasers 112-114. FIG. 5 illustrates the ladder of synthetic waves in an exemplary embodiment. A first synthetic wave is created by the frequency difference between the light beam from laser 112 and the light beam from laser 113. When these two light beams are combined, the combination creates a wave that oscillates at a beat frequency, which is referred to as the first synthetic wave (labeled synthetic wave 1 in FIG. 5). The frequency of the first synthetic wave will be the difference in frequency between the light beam from laser 112 and the light beam from laser 113. A second synthetic wave is created by the frequency difference between the light beam from laser 112 and the light beam from laser 114. When these two light beams are combined, the combination creates a wave that oscillates at a beat frequency, which is referred to as the second synthetic wave (labeled synthetic wave 2 in FIG. 5). The frequency of the second synthetic wave will be the difference in frequency between the light beam from laser 112 and the light beam from laser 114. Yet another synthetic wave will be created by the frequency difference between the light beam from laser 112 and the light beam from laser 113. However, the frequency of this synthetic wave will be close to the frequency of the second synthetic wave described above, so it may be ignored.

The ladder of synthetic waves in FIG. 5 includes two synthetic waves. However, if more lasers are added to measurement unit 110, then more synthetic waves are created for the ladder. For example, if a fourth CW laser is added, then a third synthetic wave will be created by the frequency difference between the light beam from laser 112 and the light beam from the fourth laser. If a fifth CW laser is added, then a fourth synthetic wave will be created by the frequency difference between the light beam from laser 112 and the light beam from the fifth laser. The number of synthetic waves in the ladder may depend on the accuracy desired for the distance measurements, the distance between sensor 100 and the target, etc.

Because signal processor 144 knows the frequencies of the synthetic waves, signal processor 144 also knows the wavelength for each synthetic wave. The wavelength of the first synthetic wave is labeled $\lambda_{syn1}$, and the wavelength of the second synthetic wave is labeled $\lambda_{syn2}$. In order to get a distance measurement out of the synthetic waves, signal processor 144 determines the phase of the synthetic waves in the interference beam, as the synthetic waves will carry information (e.g., amplitude and phase) of the interference beam. In measurement unit 110 however, the frequencies of one or more of the synthetic waves may be too high to process with conventional signal processing. To identify the phases of the synthetic waves, signal processor 144 processes information on heterodynes created for each measurement channel, as is described below.

Figure 6:
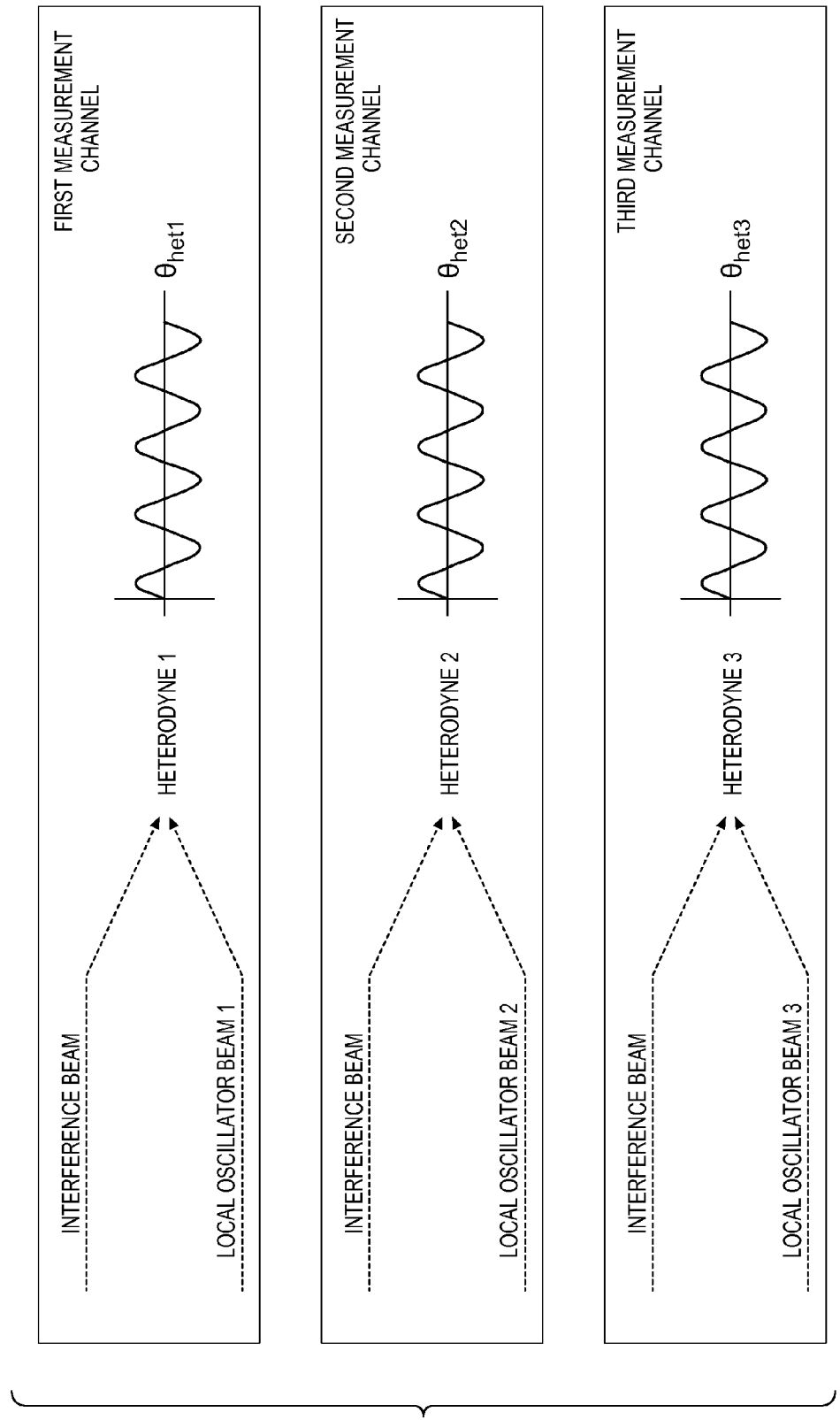
FIG. 6 illustrates heterodynes created for the measurement channels in an exemplary embodiment.

FIG. 6 illustrates heterodynes created for the measurement channels in an exemplary embodiment. The interference beam is a combination of the light beams from lasers 112-114. When the interference beam is combined with the local oscillator beams, the local oscillator beam for the first measurement channel will interfere with the light beam of the first measurement channel to create a first heterodyne that oscillates at a much lower beat frequency. The frequency of the first heterodyne (heterodyne 1 in FIG. 6) will be the difference in frequency between the light beam from laser 112 and the local oscillator beam for the first measurement channel (as determined by frequency shifter 124 in FIG. 1). The first heterodyne carries information (e.g., amplitude and phase) of the interference beam that relates to the first measurement channel. The frequency of the first heterodyne is in the RF spectrum (e.g., 170 Hz), so signal processor 144 can easily extract an optical phase ($\theta_{het1}$) for the first heterodyne.

In a similar manner, the local oscillator beam for the second measurement channel will interfere with the light beam of the second measurement channel to create a second heterodyne that oscillates at a much lower beat frequency. The frequency of the second heterodyne (heterodyne 2 in FIG. 6) will be the difference in frequency between the light beam from laser 113 and the local oscillator beam for the second measurement channel (as determined by frequency shifter 125 in FIG. 1). The second heterodyne carries information (e.g., amplitude and phase) of the interference beam that relates to the second measurement channel. Signal processor 144 can extract an optical phase ($\theta_{het2}$) for the second heterodyne.

The local oscillator beam for the third measurement channel will interfere with the light beam of the third measurement channel to create a third heterodyne that oscillates at a much lower beat frequency. The frequency of the third heterodyne (heterodyne 3 in FIG. 6) will be the difference in frequency between the light beam from laser 114 and the local oscillator beam for the third measurement channel (as determined by frequency shifter 126 in FIG. 1). The third heterodyne carries information (e.g., amplitude and phase) of the interference beam that relates to the third measurement channel. Signal processor 144 can extract an optical phase ($\theta_{het3}$) for the third heterodyne.

After determining the optical phases for the heterodynes of the measurement channels, signal processor 144 can determine the phases of the synthetic waves based on the optical phases extracted from the heterodynes. The first synthetic wave is created based on a frequency difference between the light beam from laser 112 and the light beam from laser 113 within the interference beam (see FIG. 5). Signal processor 144 can determine a phase ($\theta_{syn1}$) for the first synthetic wave based on the difference between the optical phase of the first heterodyne and the optical phase of the second heterodyne. The second synthetic wave is created based on a frequency difference between the light beam from laser 112 and the light beam from laser 114 within the interference beam (see FIG. 5). Signal processor 144 can determine a phase ($\theta_{syn2}$) for the second synthetic wave based on the difference between the optical phase of the first heterodyne and the optical phase of the third heterodyne. Therefore, signal processor 144 is able to calculate a phase for each of the synthetic waves based on the optical phases extracted from the heterodynes.

At this stage, signal processor 144 has a wavelength ($\lambda_{syn1}$) and phase ($\theta_{syn1}$) for the first synthetic wave, and a wavelength ($\lambda_{syn2}$) and phase ($\theta_{syn2}$) for the second synthetic wave. With this information for the synthetic waves, signal processor 144 is able to calculate a distance to the target. Signal processor 144 first processes the data for the synthetic wave having the longest wavelength (assume for this example the synthetic wave having the longest wavelength is the first synthetic wave). It is assumed in this embodiment that the distance from sensor 100 to the target is less than the wavelength of the longest wavelength synthetic wave. Signal processor 144 uses the following equation to calculate a distance:

$$Z = \lambda * \theta,$$

where Z is a distance, $\lambda$ is wavelength (e.g., nm), and $\theta$ is phase (e.g., radians or cycles).

Signal processor 144 may then multiply the wavelength ($\lambda_{syn1}$) for the first synthetic wave and the phase ($\theta_{syn1}$) for the first synthetic wave to get a distance value ($Z_1$). This distance value represents where the target is located in the period of the first synthetic wave. For example, if the wavelength of the first synthetic wave is one meter and the phase of the first synthetic wave is 0.5 cycles, then signal processor 144 calculates the distance to the target to be 0.5 meters.

Next, signal processor 144 processes the data for the next shorter synthetic wave in the ladder (assume for this example the second synthetic wave is next in the ladder). Signal processor 144 calculates an estimated phase ($\theta_{est}$) of the second synthetic wave by dividing the distance value ($Z_1$) calculated for the first synthetic wave from the wavelength ($\lambda_{syn2}$) of the second synthetic wave. The estimated phase ($\theta_{est}$) has both an integer and fractional component. Signal processor 144 adds the integer portion of the estimated phase ($\theta_{est}$) to the phase ($\theta_{syn2}$) measured for the second synthetic wave to get a total phase ($\theta_{syn2total}$) for the second synthetic wave. The total phase ($\theta_{syn2total}$) for the second synthetic wave represents the number of cycles that occur on the second synthetic wave between the sensor 100 and the target. Signal processor 144 then multiplies the total phase ($\theta_{syn2total}$) for the second synthetic wave and the wavelength ($\lambda_{syn2}$) for the second synthetic wave to calculate a more accurate distance value ($Z_2$).

For example, assume that signal processor 144 calculated a value of 0.5 meters for $Z_1$, and the wavelength ($\lambda_{syn2}$) of the second synthetic wave is 10 mm. Signal processor 144 then divides 0.5 meters by 10 mm resulting in a value of 50, which is the estimated phase ($\theta_{est}$) of the second synthetic wave. Signal processor 144 then adds the integer portion of the estimated phase ($\theta_{est}$) to the phase ($\theta_{syn2}$) measured for the second synthetic wave. Assume for this example that the phase ($\theta_{syn2}$) measured for the second synthetic wave is 0.57. The total phase ($\theta_{syn2total}$) for the second synthetic wave is therefore the sum of the estimated phase ($\theta_{est}$) and the phase ($\theta_{syn2}$) measured for the second synthetic wave, which is 50.57. Signal processor 144 then multiplies the total phase ($\theta_{syn2total}$) for the second synthetic wave with the wavelength ($\lambda_{syn2}$) for the second synthetic wave to calculate a distance value ($Z_2$). If the wavelength ($\lambda_{syn2}$) for the second synthetic wave is 10 mm, then the product of the total phase ($\theta_{syn2total}$) for the second synthetic wave and the wavelength ($\lambda_{syn2}$) is 0.5057 meters (50.57*10 mm). This distance measurement has a higher resolution than the prior distance measurement for the longer wavelength, which was 0.5 meters.

Signal processor 144 may repeat the above process for each synthetic wave in the ladder that has the next shorter wavelength until the distance value (Z) has a desired accuracy.

Signal processor 144 may also process data from the reference channel to determine if any unintended phase is being added into the system by frequency shifters 124-126. The sensor beam 420 (see FIG. 4) from combiner 130 travels to combiner 150. Combiner 150 also receives the collective local oscillator beam 422 from combiner 128 (through splitter 152), and combines or mixes these beams to generate a reference synthetic wave beam 440. Reference synthetic wave beam 440 then travels to photodetector device 146. Photodetector device 146 senses the light from the reference synthetic wave beam 440, and generates electrical signals representing the reference synthetic wave beam 440. Photodetector device 146 then provides the electrical signals to signal processor 144.

Signal processor 144 processes the electrical signals from photodetector device 146 to detect heterodynes in the reference synthetic wave beam 440 (see FIG. 4). When the sensor beam 440 is combined with the local oscillator beams, the local oscillator beam for the first measurement channel will interfere with the light beam from laser 112 in the sensor beam to create a heterodyne in the reference channel, which is referred to as the fourth heterodyne. The frequency of this heterodyne will be the difference in frequency between the light beam from laser 112 and the local oscillator beam for the first measurement channel (as determined by frequency shifter 124 in FIG. 1). Signal processor 144 can extract an optical phase ($\theta_{het4}$) for the fourth heterodyne of the reference channel.

In a similar manner, the local oscillator beam for the second measurement channel will interfere with the light beam from laser 113 in the sensor beam to create another heterodyne in the reference channel, referred to as the fifth heterodyne. The frequency of this heterodyne will be the difference in frequency between the light beam from laser 113 and the local oscillator beam for the second measurement channel (as determined by frequency shifter 125 in FIG. 1). Signal processor 144 can extract an optical phase ($\theta_{het5}$) for the fifth heterodyne of the reference channel.

The local oscillator beam for the third measurement channel will interfere with the light beam of laser 114 in the sensor beam to create yet another heterodyne in the reference channel, which is referred to as the sixth heterodyne. The frequency of this heterodyne will be the difference in frequency between the light beam from laser 114 and the local oscillator beam for the third measurement channel (as determined by frequency shifter 126 in FIG. 1). Signal processor 144 can extract an optical phase ($\theta_{het6}$) for the sixth heterodyne of the reference channel.

Signal processor 144 can then compare the heterodynes calculated in the measurement channels with the heterodynes in the reference channels to determine if any extraneous phase is being introduced into the system by frequency shifters 124-126. For example, signal processor 144 can compare the optical phase ($\theta_{het1}$) of the first heterodyne of the first measurement channel with the optical phase ($\theta_{het4}$) of the fourth heterodyne of the reference channel. Signal processor 144 can compare the optical phase ($\theta_{het2}$) of the second heterodyne of the second measurement channel with the optical phase ($\theta_{het5}$) of the fifth heterodyne of the reference channel. Signal processor 144 can also compare the optical phase ($\theta_{het3}$) of the third heterodyne of the third measurement channel with the optical phase ($\theta_{het6}$) of the sixth heterodyne of the reference channel. If there are any discrepancies, signal processor 144 will subtract the optical phase of the reference channel from the optical phase of the measurement channels to correct the heterodynes in the measurement channels.

Figure 7:
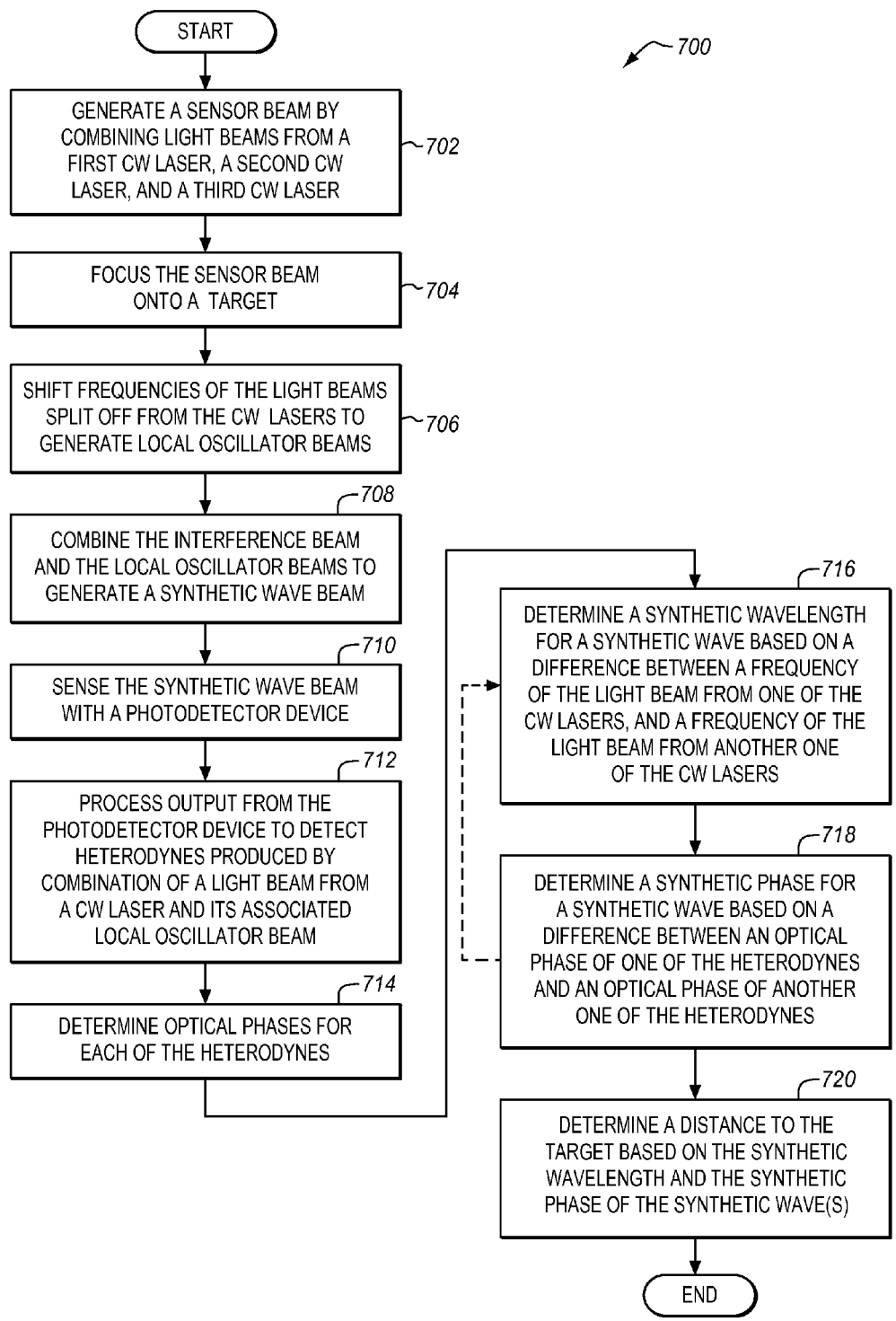
FIG. 7 is a flow chart illustrating a method for operating a laser ranging sensor in an exemplary embodiment.

Although a process for operating sensor 100 was described above, the following summarizes an exemplary method for measuring a distance to the target 204 using synthetic wave interferometry. FIG. 7 is a flow chart illustrating a method 700 for operating laser ranging sensor 100 in an exemplary embodiment. Method 700 will be described with respect to laser ranging sensor 100 of FIG. 1, although one skilled in the art will recognize that methods described herein may be performed by other devices or systems not shown. The steps of the methods described herein are not all inclusive and may include other steps not shown. The steps may also be performed in an alternate order.

As described above, method 700 uses synthetic wave interferometry to determine a distance to the target 204. Step 702 comprises generating a sensor beam by combining light beams from a first continuous-wave (CW) laser, a second CW laser, and a third CW laser, and step 704 comprises focusing the sensor beam onto the target 204. The light reflected from the target 204 interferes with the sensor beam resulting in an interference beam. Step 706 comprises shifting frequencies of the light beams split off from the CW lasers to generate local oscillator beams. Step 708 comprises combining the interference beam and the local oscillator beams to generate a synthetic wave beam, and step 710 comprises sensing the synthetic wave beam with a photodetector device. Step 712 comprises processing output from the photodetector device to detect heterodynes produced by combination of a light beam from a CW laser and its associated local oscillator beam, and step 714 comprises determining optical phases for each of the heterodynes.

The method of FIG. 7 determines the distance to the target 204 by processing data from synthetic waves present in the synthetic wave beam. For a first synthetic wave, method 700 includes the step 716 of determining a synthetic wavelength for the first synthetic wave based on a difference between a frequency of the light beam from a first one of the CW lasers, and a frequency of the light beam from a second one of the CW lasers. Method 700 further includes the step 718 of determining a synthetic phase for the first synthetic wave based on a difference between an optical phase of the first one of the heterodynes and an optical phase of a second one of the heterodynes.

Steps 716-718 then repeat for additional synthetic waves. For example, for a second synthetic wave, step 716 comprises determining a synthetic wavelength for the second synthetic wave based on a difference between a frequency of the light beam from a first one of the CW lasers, and a frequency of the light beam from a third one of the CW lasers. Step 718 comprises determining a synthetic phase for the second synthetic wave based on a difference between an optical phase of the first one of the heterodynes and an optical phase of a third one of the heterodynes. If additional synthetic waves are present in the synthetic wave beam, then steps 716-718 may repeat for n synthetic waves.

After the data for the synthetic waves is determined, method 700 further includes the step 720 of determining the distance to the target based on the synthetic wavelength and the synthetic phase of the synthetic wave(s).

In another embodiment, a plurality of laser ranging sensors as described above may be used in conjunction with one another to determine the position of one or more targets in a coordinate system. For example, assume that object 202 in FIG. 2 is a part being assembled at a large facility. A plurality of laser ranging sensors as described above may be installed at known locations in the facility to determine the location or position of one or more targets on object 202.

Figure 8:
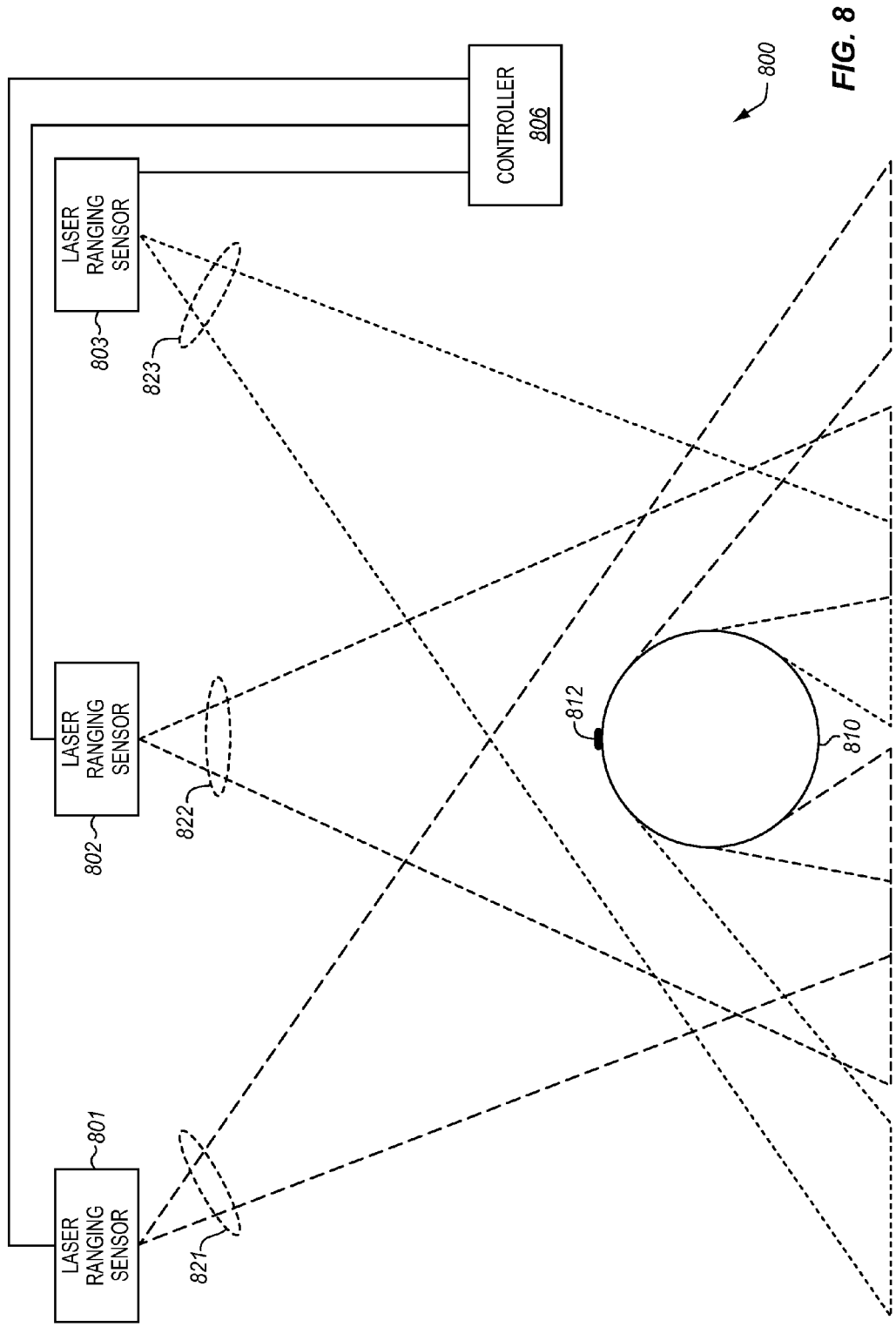
FIG. 8 illustrates a system for determining the position of one or more targets in a coordinate system in an exemplary embodiment.

FIG. 8 illustrates a system 800 for determining the position of one or more targets in a coordinate system in an exemplary embodiment. The system 800 in FIG. 8 uses the concept of trilateration to determine the position of a target 812 on an object 810 in a coordinate system. For example, object 810 may comprise a part of an aircraft that is being manufactured or assembled. Target 812 may comprise a retro-reflective target.

For system 800, three laser ranging sensors 801-803 are installed to measure a distance to target 812. Those skilled in the art will appreciate that although three laser ranging sensors 801-803 are shown, more laser ranging sensors may be implemented in other embodiments. Laser ranging sensors 801-803 may be installed on a ceiling in the facility where object 810 is being manufactured or assembled, or any other location with a line-of-sight to object 810. Also, the locations of laser ranging sensors 801-803 are known in a coordinate system associated with object 810. System 800 therefore resembles an "indoor GPS" system.

System 800 also includes a controller 806 that is coupled to laser ranging sensors 801-803. Controller 806 is configured to receive distance measurements to target 812 from each of laser ranging sensors 801-803. Based on these distance measurements, controller 806 is able to calculate a position or location of object 812 in the coordinate system associated with object 810.

Figure 9:
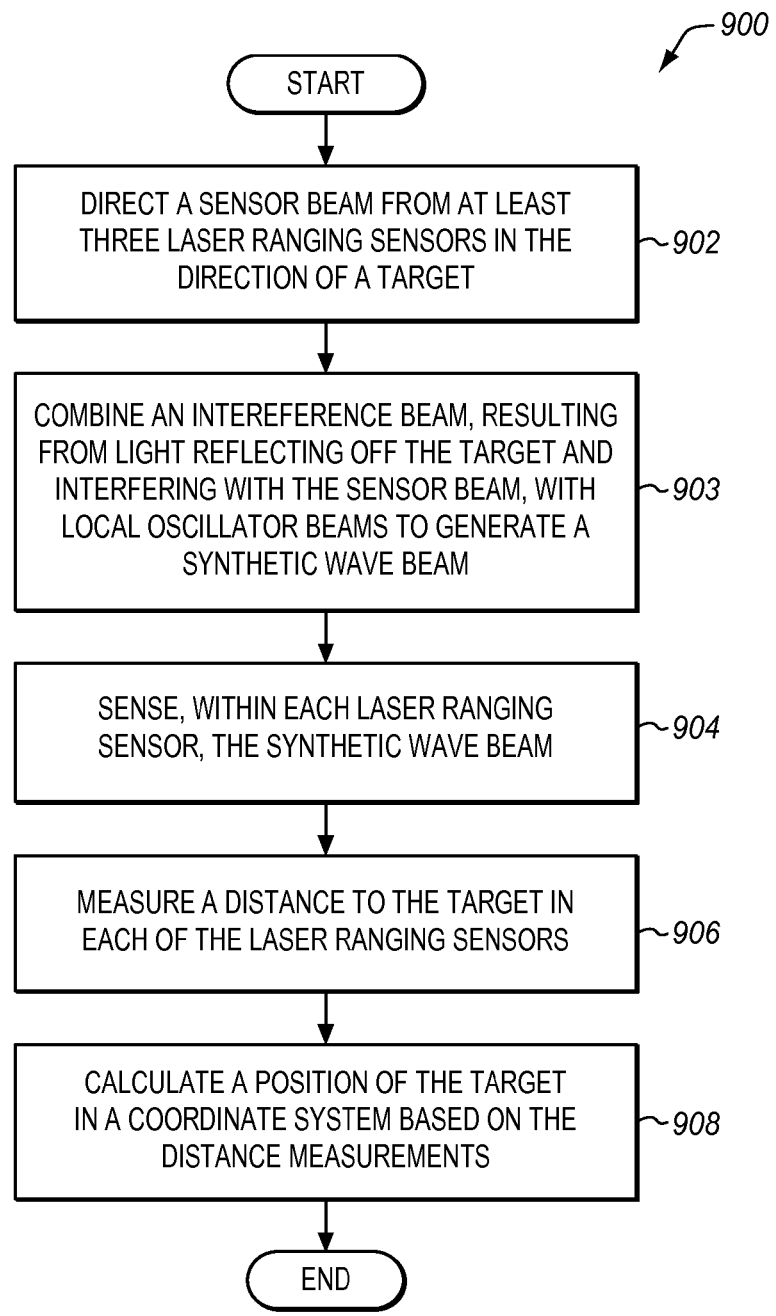
FIG. 9 is a flow chart illustrating a method for determining the position of a target in an exemplary embodiment.

FIG. 9 is a flow chart illustrating a method 900 for determining the position of target 812 in an exemplary embodiment. Method 900 will be described with respect to system 800 of FIG. 8, although one skilled in the art will recognize that methods described herein may be performed by other devices or systems not shown. The steps of the methods described herein are not all inclusive and may include other steps not shown. The steps may also be performed in an alternate order.

In step 902, laser ranging sensors 801-803 are each configured to direct a sensor beam in the direction of target 812. To illustrate this, FIG. 8 shows laser ranging sensor 801 transmitting a sensor beam 821 toward target 812, laser ranging sensor 802 transmitting a sensor beam 822 toward target 812, and laser ranging sensor 803 transmitting a sensor beam 823 toward target 812. The sensor beam from each laser ranging sensor 801-803 represents a sensor beam as discussed above for laser ranging sensor 100. Therefore, each sensor beam 821-823 is a mix of a plurality of light beams from CW lasers. In this embodiment, each sensor beam 821-823 is a cone of light having a wide beam spread. The width of the cone can be adjusted as desired, but the assumption is that sensor beams 821-823 should at least have a beam spread with a width greater than a width of the target 812. That way, sensors 801-803 don't necessarily have to be aimed directly at an individual target for a measurement. The cone of light from sensors 801-803 can be projected in the direction of one or more targets, and the targets will reflect light to create the interference beam for each sensor 801-803.

When the sensor beam 821 is transmitted at target 812 from laser ranging sensor 801, for example, light reflected from target 812 will interfere with the sensor beam 821 being transmitted. The reflected light will be at the same frequencies as the light frequencies making up sensor beam 821 when target 812 is stationary. When the light from the sensor beam 821 is in-phase with the reflected light (at the same frequencies), then constructive interference occurs. When the light from the sensor beam 821 is out-of-phase with the reflected light, then destructive interference occurs. The result of the interference is referred to as an "interference" beam for laser ranging sensor 801. A similar interference beam is created for each of laser ranging sensors 802-803.

Additionally, each laser ranging sensor 801-803 combines its corresponding interference beam with local oscillator beams (see step 903 in FIG. 9) as described above. The combination of the interference beam and the local oscillator beams within each laser ranging sensor 801-803 generates a synthetic wave beam. Therefore, each laser ranging sensor 801-803 is able to sense the synthetic wave beam (see step 904 of FIG. 9).

Figure 10:
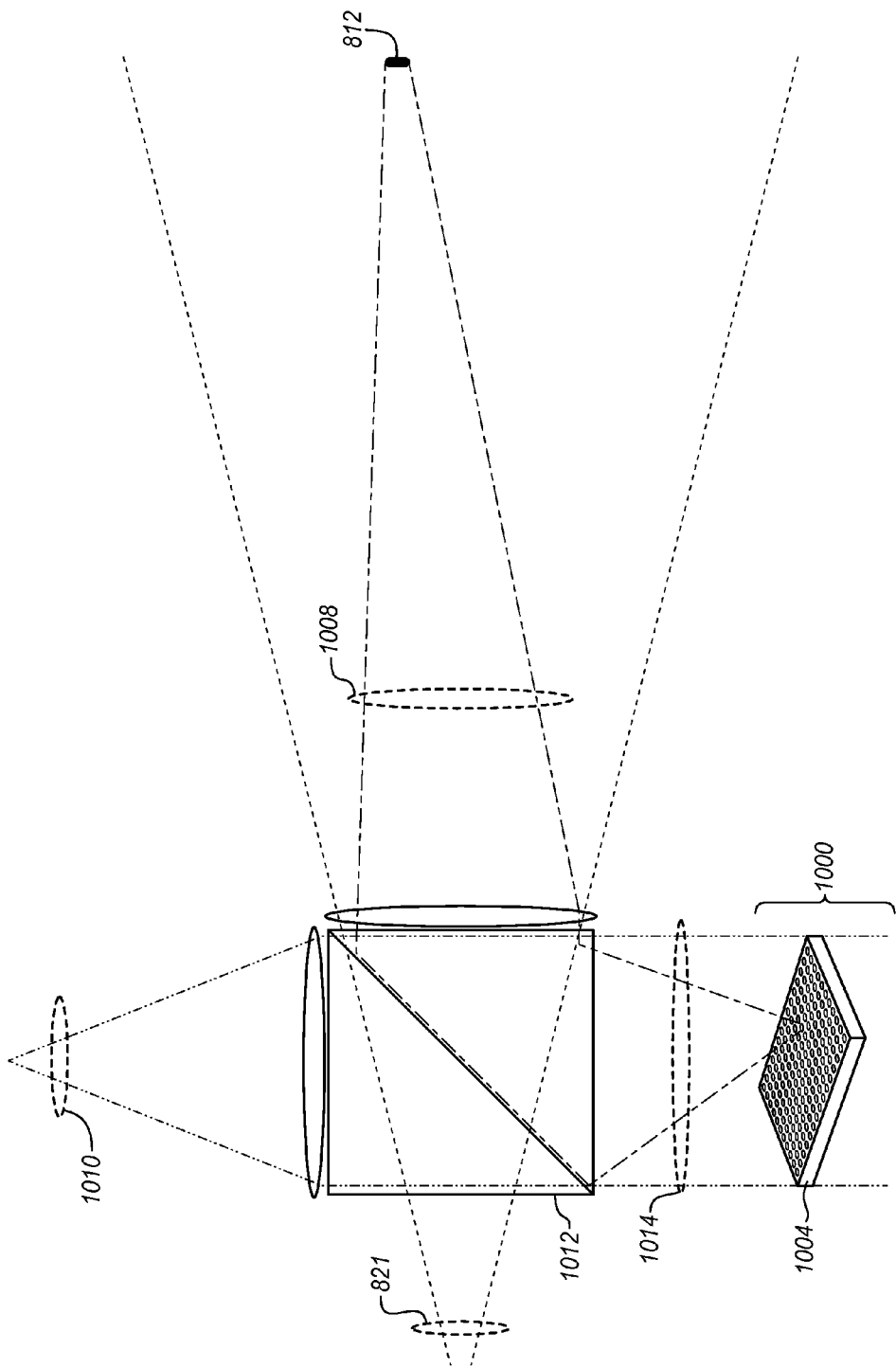
FIG. 10 illustrates a photodetector device of a laser ranging sensor in an exemplary embodiment.

In step 906 of FIG. 9, each laser ranging sensor 801-803 is configured to process its corresponding synthetic wave beam to measure a distance to target 812. An exemplary process for measuring a distance to target 812 uses synthetic wave interferometry, which was described in detail above in FIGS. 1-7. In the present embodiment, laser ranging sensors 801-803 each use a photodetector device that includes an array of photodetectors when sensing their corresponding synthetic wave beam. FIG. 10 illustrates a photodetector device 1000 of a laser ranging sensor in an exemplary embodiment. Photodetector device 1000 is comprised of a photodetector array 1004. Photodetector array 1004 comprises a set of photodetector elements. The photodetector elements may be connected to amplifiers or other associated circuitry to form an integrated circuit. Photodetector array 1004 may be a component in a digital camera, such as a CMOS sensor or a charge-coupled device (CCD) sensor.

To illustrate how photodetector device 1000 may be used in operation, the sensor beam 821 from laser ranging sensor 801 (see also FIG. 8) is shown as being transmitted toward target 812. As described above, laser ranging sensor 801 emits sensor beam 821 as a cone of light that has a beam width greater than a width of the target 812. The light reflected off target 812 interferes with the sensor beam 821 being transmitted to form the interference beam 1008. Also illustrated in FIG. 10 is the collective local oscillator beam 1010 generated within laser ranging sensor 801 (see FIG. 4 for an explanation on generating a collective local oscillator beam). The interference beam 1008 is mixed with the collective local oscillator beam 1010 within optical combiner 1012. The combination of the interference beam 1008 and the collective local oscillator beam 1010 is referred to herein as a synthetic wave beam. The synthetic wave beam 1014 from combiner 1012 is projected onto photodetector array 1004. The individual photodetector elements in photodetector array 1004 are therefore able to sense the light at their particular pixel locations in the array, and generate an electrical signal. The electrical signals from the photodetector elements are then transferred to a signal processor as described above in FIGS. 1-7.

The signal processor may then process the electrical signals from the photodetector array 1004 to calculate one or more distance measurements for target 812. In operation, it may be assumed that one photodetector element will be illuminated by light reflected off target 812. Therefore, the signal processor may only need to calculate a distance measurement for one pixel in the photodetector array 1004. However, if multiple photodetector elements are illuminated by light reflected off target 812, then the signal processor is able to calculate a distance measurement for one or more individual pixels in the photodetector array 1004 that are illuminated.

A similar process is performed in each of the laser ranging sensors 801-803 (see FIG. 8) so that each laser ranging sensor 801-803 measures a distance measurement to target 812 (see step 906 of FIG. 9). Controller 806 then receives the distance measurements from each of the laser ranging sensors 801-803. Controller 806 is able to calculate a position of target 812 in the coordinate system based on the distance measurements (see step 908 of FIG. 9). For example, controller 806 may calculate three-dimensional (3D) coordinates (e.g., Cartesian x, y, z coordinates) for target 812 in the coordinate system of object 810 based on the distance measurements. With three (or more) distance measurements, controller 806 is able to use trilateration to determine the precise position (or 3D coordinates) of target 812 in the coordinate system.

Because laser ranging sensors 801-803 emit sensor beams with a wide beam spread and use a photodetector array, multiple targets may be measured by each laser ranging sensor 801-803. Each of the targets that are illuminated by the sensor beams of laser ranging sensors 801-803 will reflect light to form the interference beams. Thus, each of the targets will illuminate different photodetector elements in the photodetector array of the laser ranging sensors 801-803. Output from the individual photodetector elements in the photodetector array can then be processed to measure a distance to each of the targets. The position of each of the targets can then be determined using trilateration.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
at least three laser ranging sensors each configured to direct a sensor beam of continuous-wave light toward a target, wherein a beam spread of the sensor beam has a width greater than a width of the target;
at least one of the laser ranging sensors configured to combine light beams from at least three continuous-wave lasers each tuned to different wavelengths to generate the sensor beam that is directed toward the target;
the laser ranging sensors each configured to combine an interference beam, resulting from light reflecting off the target and interfering with the sensor beam, with local oscillator beams to generate a synthetic wave beam;
the laser ranging sensors each including a photodetector device comprising an array of photodetectors configured to sense the synthetic wave beam, and to measure a distance to the target based on output from the array of photodetectors; and
a controller configured to receive a distance measurement from each of the laser ranging sensors, and to calculate a position of the target in a coordinate system based on the distance measurements.

2. The apparatus of claim 1 wherein:
the array of photodetectors comprises a component in a digital camera.

3. The apparatus of claim 1 wherein the at least one of the laser ranging sensors comprises:
a first continuous-wave laser configured to generate a first light beam;
a second continuous-wave laser configured to generate a second light beam;
a third continuous-wave laser configured to generate a third light beam;
a first optical combiner configured to combine the first, second, and third light beams to generate the sensor beam;
a telescope configured to focus the sensor beam onto the target, where reflected light from the target interferes with the sensor beam resulting in the interference beam;
a frequency shifter unit configured to receive a portion of the first, second, and third light beams, and to frequency shift the first, second, and third light beams to generate first, second, and third local oscillator beams;
a second optical combiner configured to combine the interference beam and the first, second, and third local oscillator beams to generate the synthetic wave beam;
the photodetector device comprising the array of photodetectors configured to sense the synthetic wave beam to generate output signals; and
a signal processor configured to process the output signals from the array of photodetectors to detect a first heterodyne produced by combination of the first light beam and the first local oscillator beam, to detect a second heterodyne produced by combination of the second light beam and the second local oscillator beam, to detect a third heterodyne produced by combination of the third light beam and the third local oscillator beam, and to determine optical phases for each of the first, second, and third heterodynes;
the signal processor is configured to determine a first synthetic wavelength for a first synthetic wave based on a difference between a first frequency of the first light beam and a second frequency of the second light beam, to determine a first synthetic phase for the first synthetic wave based on a difference between a first optical phase of the first heterodyne and a second optical phase of the second heterodyne, and to determine a distance to the target based on the first synthetic wavelength and the first synthetic phase.

4. The apparatus of claim 3 wherein:
the signal processor is configured to determine a second synthetic wavelength for a second synthetic wave based on a difference between the first frequency of the first light beam and a third frequency of the third light beam, to determine a second synthetic phase for the second synthetic wave based on a difference between the first optical phase of the first heterodyne and a third optical phase of the third heterodyne, and to determine the distance to the target based further on the second synthetic wavelength and the second synthetic phase.

5. The apparatus of claim 4 wherein:
the signal processor is configured to multiply the first synthetic wavelength and the first synthetic phase to calculate a first distance measurement to the target for the first synthetic wave.

6. The apparatus of claim 5 wherein:
the signal processor is configured to calculate an estimated phase of the second synthetic wave by dividing the first distance measurement calculated for the first synthetic wave by the second synthetic wavelength of the second synthetic wave, to add an integer portion of the estimated phase to the second synthetic phase to get a total phase for the second synthetic wave, and to multiply the total phase for the second synthetic wave and the second synthetic wavelength to calculate a second distance measurement for the second synthetic wave.

7. The apparatus of claim 3 wherein the at least one of the laser ranging sensors further comprises:
a frequency comb laser configured to generate a set of light beams comprising a frequency comb;
a third optical combiner configured to combine the set of light beams from the frequency comb laser with the first, second, and third light beams from the first, second, and third continuous-wave lasers; and
a phase-lock controller configured to compare the frequencies of the first, second, and third light beams with the frequency comb generated by the frequency comb laser, and to tune the frequencies of the first, second, and third light beams from the first, second, and third continuous-wave lasers to different teeth of the frequency comb.

8. The apparatus of claim 7 wherein:
the teeth of the frequency comb are separated by a pulse repetition frequency of the frequency comb laser; and the pulse repetition frequency of the frequency comb laser is tied to a frequency standard.

9. The apparatus of claim 8 wherein:
the frequency standard is defined by the National Institute of Standards and Technology (NIST).

10. The apparatus of claim 3 wherein:
the signal processor is configured to calculate a distance measurement for individual pixels in the array of photodetectors.

11. A method of measuring a position of a target in a coordinate system, the method comprising:
directing a sensor beam of continuous-wave light toward the target from each of at least three laser ranging sensors, wherein a beam spread of the sensor beam has a width greater than a width of the target;
wherein at least one of the laser ranging sensors is configured to combine light beams from at least three continuous-wave lasers each tuned to different wavelengths to generate the sensor beam that is directed toward the target;
in each of the laser ranging sensors, combining an interference beam, resulting from light reflecting off the target and interfering with the sensor beam, with local oscillator beams to generate a synthetic wave beam;
sensing, in each of the laser ranging sensors, the synthetic wave beam using an array of photodetectors;
measuring a distance to the target in each of the laser ranging sensors based on output from the array of photodetectors; and
calculating the position of the target in the coordinate system based on the distance measurements from the laser ranging sensors.

12. The method of claim 11 wherein sensing the synthetic wave beam comprises:
sensing the synthetic wave beam with the array of photodetectors in a digital camera.

13. The method of claim 11 wherein the steps of directing a sensor beam, sensing an interference beam, and measuring a distance to the target in at least one of the laser ranging sensors further comprises:
generating light beams in each of a first continuous-wave laser, a second continuous-wave laser, and a third continuous-wave laser;
combining the light beams received from the first, second, and third continuous-wave lasers to generate the sensor beam;
focusing the sensor beam onto the target, where reflected light from the target interferes with the sensor beam resulting in the interference beam;
shifting frequencies of the light beams split off from the continuous-wave lasers to generate local oscillator beams;
combining the interference beam and the local oscillator beams to generate the synthetic wave beam;
sensing the synthetic wave beam with a photodetector device comprising the array of photodetectors;
processing output from the array of photodetectors to detect a first heterodyne produced by combination of a first light beam from the first continuous-wave laser and a first local oscillator beam, to detect a second heterodyne produced by combination of a second light beam from the second continuous-wave laser and a second local oscillator beam, and to detect a third heterodyne produced by combination of a third light beam from the third continuous-wave laser and a third local oscillator beam;
determining optical phases for each of the first, second, and third heterodynes;
determining a first synthetic wavelength for a first synthetic wave based on a difference between a first frequency of the first light beam and a second frequency of the second light beam;
determining a first synthetic phase for the first synthetic wave based on a difference between a first optical phase of the first heterodyne and a second optical phase of the second heterodyne; and
determining the distance to the target based on the first synthetic wavelength and the first synthetic phase.

14. The method of claim 13 further comprising:
determining a second synthetic wavelength for a second synthetic wave based on a difference between the first frequency of the first light beam and a third frequency of the third light beam;
determining a second synthetic phase for the second synthetic wave based on a difference between the first optical phase of the first heterodyne and a third optical phase of the third heterodyne; and
determining the distance to the target based further on the second synthetic wavelength and the second synthetic phase.

15. The method of claim 14 further comprising:
multiplying the first synthetic wavelength and the first synthetic phase to calculate a first distance measurement to the target for the first synthetic wave.

16. The method of claim 15 further comprising:
calculating an estimated phase of the second synthetic wave by dividing the first distance measurement calculated for the first synthetic wave by the second synthetic wavelength of the second synthetic wave;
adding an integer portion of the estimated phase to the second synthetic phase to get a total phase for the second synthetic wave; and
multiplying the total phase for the second synthetic wave and the second synthetic wavelength to calculate a second distance measurement for the second synthetic wave.

17. The method of claim 13 further comprising:
generating a set of light beams comprising a frequency comb with a frequency comb laser;
combining the set of light beams from the frequency comb laser with the first, second, and third light beams from the first, second, and third continuous-wave lasers;
comparing frequencies of the first, second, and third light beams with the frequency comb generated by the frequency comb laser; and
tuning the frequencies of the first, second, and third light beams from the first, second, and third continuous-wave lasers to different teeth of the frequency comb.

18. The method of claim 17 wherein:
the teeth of the frequency comb are separated by a pulse repetition frequency of the frequency comb laser; and
the pulse repetition frequency of the frequency comb laser is tied to a frequency standard.

19. The method of claim 18 wherein:
the frequency standard is defined by the National Institute of Standards and Technology (NIST).

20. An apparatus comprising:
at least three laser ranging sensors, wherein each laser ranging sensor is configured to:
project a sensor beam toward a target, wherein the sensor beam comprises a combination of light beams from at least three continuous-wave lasers;

combine an interference beam, resulting from light reflecting off the target and interfering with the sensor beam, with local oscillator beams to generate a synthetic wave beam;

sense the synthetic wave beam using an array of photodetectors; and process the synthetic wave beam using synthetic wave interferometry to measure a distance to the target; and a controller configured to receive a distance measurement from each of the laser ranging sensors, and to calculate a position of the target in a coordinate system based on the distance measurements.

\* \* \* \* \*